Feb. 23, 1971 T. O. PAINE, ACTING 3,565,584
ADMINISTRATOR OF THE NATIONAL AERONAUTICS
AND SPACE ADMINISTRATION
GAS LIQUEFICATION AND DISPENSING APPARATUS
Filed Nov. 29, 1968

INVENTOR.
STANLEY M. HIRSHFIELD

BY
ATTORNEYS.

United States Patent Office 3,565,584
Patented Feb. 23, 1971

---

3,565,584
GAS LIQUEFICATION AND DISPENSING APPARATUS
T.O. Paine, Acting Administrator of the National Aeronautics and Space Administration, with respect to an invention of Stanley M. Hirshfield, Canoga Park, Calif.
Filed Nov. 29, 1968, Ser. No. 780,064
Int. Cl. B01l 5/00; F28d 1/02
U.S. Cl. 23—259
3 Claims

ABSTRACT OF THE DISCLOSURE

An apparatus for condensing a reagent gas and volumetrically dispensing the resultant liquid under isolation conditions is disclosed. The apparatus comprises a volumetrically calibrated transparent container such as a graduate having a side branch liquid outlet arm. An inlet gas assembly communicates with an elongated inlet tube having an opening below the outlet arm valve which serves to isolate the liquid from the inlet valve and introduces the gas below the coolant level and below the outlet arm. The graduate is immersed in coolant during collection of liquid reagent. The outlet terminates in a needle nozzle which pierces a septum placed over the recipient vessel for the dispensed liquid reagent.

ORIGIN OF THE INVENTION

Figures 1, 2:
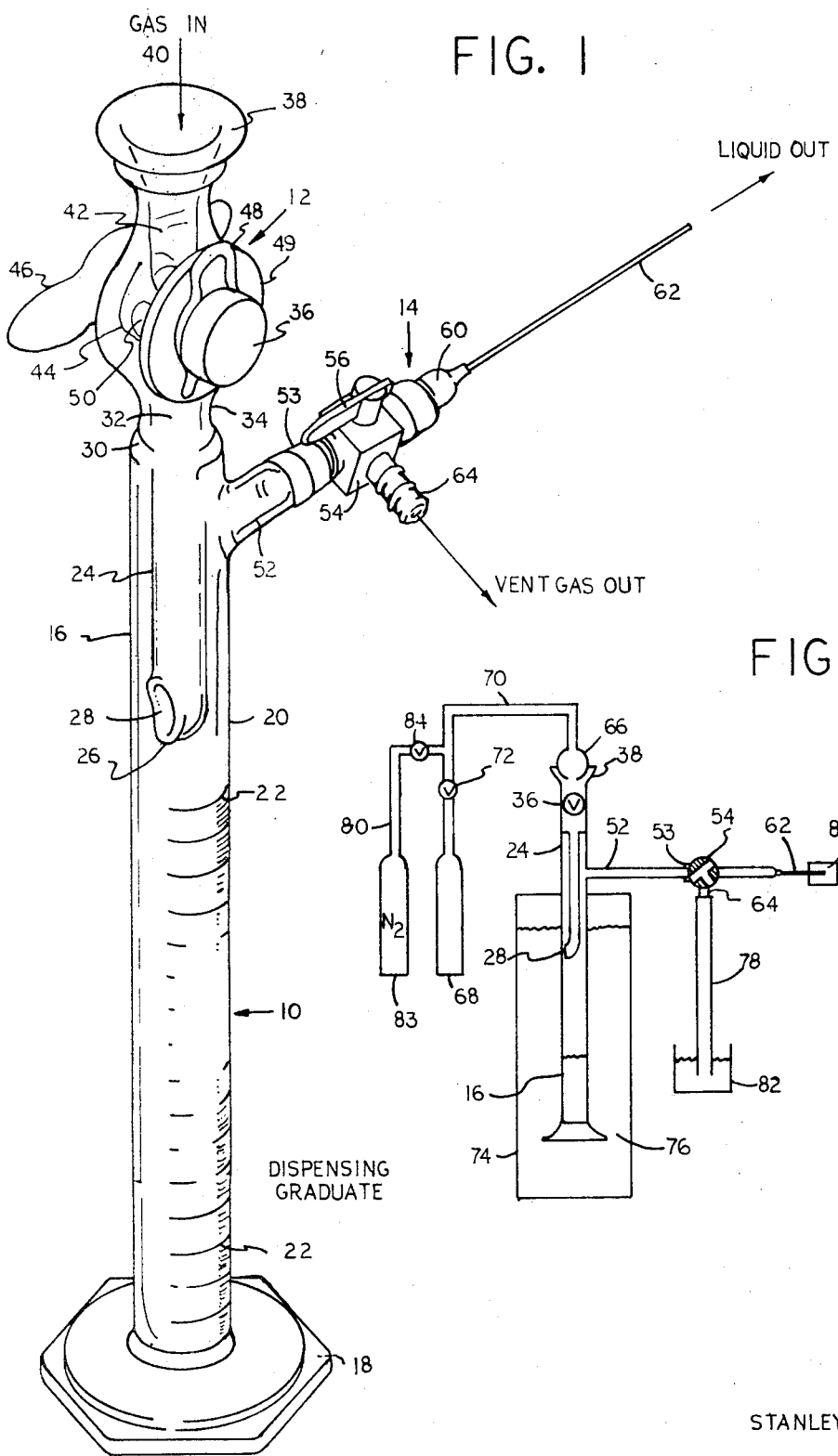

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

(1) Field of the invention

The present invention relates to an apparatus for condensing and dispensing normally volatile gases. More particularly, the invention relates to an apparatus and process for volumetrically dispensing reagent quantities of volatile chemicals for small batch reactions.

(2) Description of the prior art

It has been found very difficult to conveniently provide accurate quantities of uncontaminated gaseous reactants for small batch reactions. Critical control of these small quantities is very significant to the collection of meaningful data. For example, in polymer research involving butadiene polymerization, a slight error in the quantity of butadiene introduced can grossly influence both the quantity of homopolymer or copolymer produced as well as the elastomeric properties of the final product which is largely influenced by the ratios of monomers present. Furthermore, the presence of oxygen or water vapor can grossly influence the properties of the final product by forming cross-linking bonds or by activating or deactivating the catalyst.

Presently, small quantities of gaseous reagents are obtained by dispensing gas from heavy pressure vessels while they are being weighed on a large balance. It is extremely difficult to maintain precision between experiments with the use of such equipment since such small differential weights will be obtained from such large and heavy tare weights. Precision within less than 0.1 cc. of the condensed liquid is desired and cannot be readily provided by these techniques.

OBJECTS AND SUMMARY OF THE INVENTION

It is therefore an object of the invetnion to provide for accurate dispensing of very small quantities of gaseous reagents.

A further object of the invention is the provision of an apparatus suitable for convenient use at cryogenic or near cryogenic temperatures for condensing, collecting and volumetrically dispensing normally gaseous chemicals.

Yet another object of the invention is to provide for collecting and dispensing liquefied reagents in an uncontaminated condition.

These and other objects and many attendant advantages of the invention will become apparent as the description proceeds.

The liquefying and volumetrically dispensing apparatus of the invention comprises an elongated hollow member having side walls and an open top and a closed bottom member. The lower portion of the cylinder is formed into a volumetrically calibrated chamber, at least a portion of the side wall along the chamber is transparent and is marked with visible volumetric indicia. A liquid outlet assembly containing a branch conduit and an orifice outlet member is connected to a side wall of the cylinder adjacent the top thereof through a three-way valve. The outlet orifice is preferably in the form of an elongated small-diameter dispensing nozzle member.

The inlet assembly comprises a socket joint for receiving a mating fitting for forming a gas-sealed joint. A two-way valve is provided below the fitting and communicates with an elongated gas inlet tube which extends downwardly into said cylinder and contains an opening disposed below said outlet assembly but above said calibrated chamber.

In operation of the apparatus of the invention, the chamber, usually in the form of a cylinder, is immersed into a refrigerant above the level of the opening in the gas inlet tube but below the level of the side arm outlet assembly. The apparatus is purged with inert gas, and then reagent gas is introduced and condensed in the calibrated chamber until at least the desired volume has accumulated. The reagent gas feed is then shut off, the cylinder removed from the refrigerant and a measured quantity of liquefied gas is dispensed into a reaction vessel. If desired, the apparatus may be purged before immersion in refrigerant. In one procedure, the cylinder is heated with a heat gun to vaporize moisture during nitrogen purging, and the system is then closed and inserted into refrigerant after cooling to room temperature.

The apparatus of the invention permits critical dispensing of very small volumes of reagent without the complications required with weighing heavy pressure vessels in which gaseous reactants are normally stored. The apparatus can be readily utilized with any of the near cryogenic or cryogenic fluids that are compatible with the materials from which transparent laboratory equipment is fabricated. Furthermore, the provision for inert gas blanketing of the condensed fluid eliminates the probability of contamination in handling or during storage. Furthermore, refrigerants can be tailored to suit the boiling point of the various fluids at least to liquid nitrogen temperature with currently available technology.

The inlet and outlet assemblies are positioned outside of the cryogenic environment and are thus not subject to the stresses encountered when subjected to extremely cold temperatures. Thus, the valve members remain unfrozen and freely removable throughout the operation. Furthermore, the construction of the inlet tube provides for delivery of the reagent gas below the level of the outlet tube and this permits the use of an open system during condensation and thus avoids the danger of implosion or explosion. The side wall opening in the inlet tube also isolates the inlet assembly from the liquid as it is poured out and thus provides for better maintenance of the apparatus and for more accurate measurement of the dispensed quantity of liquid.

ment of the calcium nitrate down into the hot nickel catalytic zone and also above that temperature in order to facilitate rapid reaction of the nitrate to form ammonia.

By way of example, a chart is set forth below which shows that many different types of standard nitrogen compounds can be analyzed regardless of whether they carry inorganic or organic nitrogen.

chemically analyzing the scrubbed product of pyrolysis to determine quantitatively the nitrogen present in the sample.

2. A method as in claim 1 in which the alkaline earth hydroxide is calcium hydroxide.

| Compound | Formula | (Matrix) solvent | Theoretical, p.p.m. N | Percent recovery | User category |
|---|---|---|---|---|---|
| Diethanolamine | $HN(CH_2\cdot CH_2OH)_2$ | Distilled $H_2O$ | 11.4 | 100 | Industrial. |
| Do | Same as above | do | 1.14 | 100 | Do. |
| Aminotriazol | $C_2H_4N_4$ | do | 18.1 | 92 | Pesticide. |
| Chloropheniramine | | do | 9.5 | 100 | Drug. |

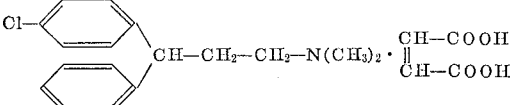

| Calcium nitrate | $Ca(NO_3)_2$ | do | 9.5 | 100 | |
| Potassium nitrate | $KNO_3$ | do | 10.5 | 100 | Inorganic |
| Manganous nitrate | $Mn(NO_3)_2$ | do | 10.0 | 100 | nitrates. |
| Nickel nitrate | $Ni(NO_3)_2$ | do | 10.7 | 100 | |
| Cystine (NBS Std.) | $C_6H_{12}O_4N_2S_2$ | .1M NaOH | 10.8 | 100 | Amino |
| Tryptophan | $C_{11}H_{12}O_2N_2$ | do | 10.0 | 100 | acids. |
| Bovine albumin | $C_{11}H_{12}O_2N_2$ | do | 23.6 | 100 | Protein. |
| Diethanolamine | $C_{11}H_{12}O_2N_2$ | Alcohol | 15.8 | 100 | Industrial |

From the above chart, it can be seen that it has been possible to obtain excellent results with the present method and apparatus in determining the amount of nitrogen in the compounds.

It is apparent from the foregoing that there has been provided a new and improved method and apparatus for the determination of nitrogen in water and in oxygenated hydrocarbon matrices. The apparatus is relatively simple and can be readily used. The method is one which can be readily performed and which is very accurate and precise.

What is claimed is:

1. In a method for the determination of nitrogen in water and in oxygenated hydrocarbon matrices, providing a carrier gas of hydrogen, introducing the sample to be analyzed in the carrier gas of hydrogen, heating the carrier gas and the sample introduced therein to volatilize the same, passing the volatilized sample over a nickel-containing catalyst at a temperature substantially in excess of 480° C., on the order of about 800° C., to cause pyrolysis to occur, scrubbing the products of pyrolysis with an alkaline earth hydroxide at a temperature ranging from about 420° C. to 480° C. to remove acidic type gases including carbon dioxide, and thereafter electro-

References Cited

UNITED STATES PATENTS

| 2,762,568 | 9/1956 | Sullivan | 23—254UX |
| 3,032,493 | 5/1962 | Coulson et al. | 204—195 |
| 3,131,348 | 4/1964 | Taylor et al. | 204—195X |
| 3,241,922 | 3/1966 | Walisch | 23—254X |
| 3,421,856 | 1/1969 | Stenger et al. | 23—230 |
| 3,427,238 | 2/1969 | Myers et al. | 204—195 |
| 3,428,432 | 2/1969 | Staunton et al. | 23—253 |
| 3,461,042 | 8/1969 | Martin et al. | 204—195 |

OTHER REFERENCES

Martin, "Fast and Sensitive Method for Determination of Nitrogen," Anal. Chem. 38:1209–13 (1966).

Coulson, "Selective Detection of Nitrogen Compounds . . . ," Chem. Abst. 65:14429d (1966).

Albert, "Determination of Nitrogen Compound Types . . . ," Anal. Chem. 39:1113–7 (1967).

MORRIS O. WOLK, Primary Examiner

D. G. CONLIN, Assistant Examiner

U.S. Cl. X.R.

23—230, 232, 253, 254; 204—195 member having a first end in sealed communication with said side wall of said container adjacent the top thereof and a second end joined to an elongated small diameter dispensing nozzle means adapted to pierce a septum during dispensing said collected liquid, said three-position valve also connecting a branch to said elongated branch arm; and gas inlet means containing a gas-tight valve and being in sealed communication with the top of said container including a central gas inlet tube extending downwardly into said container and having an opening disposed in a side wall of said inlet tube facing away from and below said outlet means.

2. An apparatus according to claim 1 in which the inlet terminates in a ground glass fitting for receiving a mating member for forming a gas-tight separable joint.

3. An apparatus according to claim 1 in which said container is formed of glass and said outlet means includes a length of glass tubing fused to an opening in the side wall of said container, a valve fitting having a threaded outlet is joined to said length of tubing and a threaded hub and hypodermic needle are connected to said threaded outlet.

References Cited
UNITED STATES PATENTS

| | | | |
|---|---|---|---|
| 1,845,247 | 2/1932 | Davidson | 62—55.5X |
| 2,434,723 | 1/1948 | Shook | 23—259X |
| 2,533,726 | 12/1950 | Floyd | 23—292X |
| 2,659,452 | 11/1953 | Gaydasch | 62—55.5 |
| 2,722,105 | 11/1955 | Keyes | 62—45X |
| 2,758,105 | 8/1956 | Alles et al. | 23—259X |
| 2,964,390 | 12/1960 | Cummings | 23—292X |

ALBERT W. DAVIS, JR., Primary Examiner

U.S. Cl. X.R.

23—292; 62—55.5; 55—269; 73—421.5, 425.4